(12) United States Patent
Onishi et al.

(10) Patent No.: US 11,309,579 B2
(45) Date of Patent: Apr. 19, 2022

(54) LITHIUM ION SECONDARY BATTERY AND METHOD FOR PRODUCING THE SAME

(71) Applicant: TOYOTA JIDOSHA KABUSHIKI KAISHA, Toyota (JP)

(72) Inventors: Rune Onishi, Toyota (JP); Ryo Suzuki, Nagakute (JP); Hideaki Oka, Nagakute (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 256 days.

(21) Appl. No.: 16/813,101

(22) Filed: Mar. 9, 2020

(65) Prior Publication Data

US 2020/0295398 A1   Sep. 17, 2020

(30) Foreign Application Priority Data

Mar. 12, 2019  (JP) .............................. JP2019-045119

(51) Int. Cl.
| | |
|---|---|
| *H01M 4/00* | (2006.01) |
| *H01M 10/0525* | (2010.01) |
| *H01M 4/66* | (2006.01) |
| *H01M 4/40* | (2006.01) |
| *H01M 4/1393* | (2010.01) |
| *H01M 4/38* | (2006.01) |
| *H01M 4/02* | (2006.01) |

(52) U.S. Cl.
CPC ..... *H01M 10/0525* (2013.01); *H01M 4/1393* (2013.01); *H01M 4/382* (2013.01); *H01M 4/405* (2013.01); *H01M 4/663* (2013.01); *H01M 2004/021* (2013.01)

(58) Field of Classification Search
CPC .. H01M 4/382; H01M 10/0525; H01M 4/587; H01M 4/133; H01M 4/134; Y02P 70/50
See application file for complete search history.

(56) References Cited

U.S. PATENT DOCUMENTS

2018/0083282 A1* 3/2018 Baba .................... H01M 4/133

FOREIGN PATENT DOCUMENTS

| JP | 2011049067 A | 3/2011 |
|---|---|---|
| JP | 2018152230 A | 9/2018 |

* cited by examiner

*Primary Examiner* — Cynthia H Kelly
*Assistant Examiner* — Monique M Wills
(74) *Attorney, Agent, or Firm* — Sughrue Mion, PLLC (57) ABSTRACT

Provided is a lithium ion secondary battery with enhanced charge-discharge characteristics. Disclosed is a lithium ion secondary battery comprising: a columnar anode comprising a carbon fiber assembly having an assembled carbon fiber structure, a cathode, and an ion-conducting, insulating separation film disposed between the cathode and the anode to insulate the cathode and the anode from each other, wherein a void content of the carbon fiber assembly is 20% or more and 40% or less, and wherein at least one of a lithium metal and a lithium alloy is contained in voids of the carbon fiber assembly, when the lithium ion secondary battery is in a fully charged state.

5 Claims, 5 Drawing Sheets

LITHIUM ION SECONDARY BATTERY AND METHOD FOR PRODUCING THE SAME

CROSS-REFERENCE TO RELATED APPLICATIONS

This application claims priority to Japanese Patent Application No. 2019-045119 filed on Mar. 12, 2019, the entire contents of which are incorporated herein by reference.

TECHNICAL FIELD

The disclosure relates to a lithium ion secondary battery and a method for producing the lithium ion secondary battery.

BACKGROUND

In recent years, with the rapid spread of IT and communication devices such as personal computers, camcorders and cellular phones, great importance has been attached to the development of batteries that is usable as the power source of such devices. In the automobile industry, etc., high-power and high-capacity batteries for electric vehicles and hybrid vehicles are under development.

A lithium ion secondary battery has attracted attention, due to its high energy density resulting from the use of a battery reaction accompanied by lithium ion transfer.

Patent Literature 1 discloses a carbon electrode comprising a carbon fiber assembly.

Patent Literature 2 discloses a secondary battery capable of further increasing energy density.

Patent Literature 1: Japanese Patent Application Laid-Open (JP-A) No. 2011-049067

Patent Literature 2: JP-A No. 2018-152230

A conventional lithium ion secondary battery has a problem of poor charge-discharge efficiency.

SUMMARY

In light of the above circumstances, an object of the disclosed embodiments is to provide a lithium ion secondary battery with enhanced charge-discharge characteristics.

In a first embodiment, there is provided a lithium ion secondary battery comprising:

a columnar anode comprising a carbon fiber assembly having an assembled carbon fiber structure, a cathode, and an ion-conducting, insulating separation film disposed between the cathode and the anode to insulate the cathode and the anode from each other, wherein a void content of the carbon fiber assembly is 20% or more and 40% or less, and wherein at least one of a lithium metal and a lithium alloy is contained in voids of the carbon fiber assembly, when the lithium ion secondary battery is in a fully charged state.

A ratio of a capacity of the anode to a capacity of the cathode (anode capacity/cathode capacity) may be smaller than 1.

A metal to be alloyed with the lithium contained in the lithium alloy, may be at least one kind of metal selected from the group consisting of gold, platinum, magnesium, zinc, tungsten, molybdenum, aluminum, gallium, indium, silicon, germanium, tin, lead, arsenic, antimony and bismuth.

The anode may be a polygonal columnar anode that a length of a side of a cross section in a direction perpendicular to a longitudinal direction, is 30 µm or more and 1000 µm or less, or a round columnar anode with a diameter of 30 µm or more and 1000 µm or less, and an outer circumferential surface other than end surfaces in the longitudinal direction may face the cathode through the separation film.

In a second embodiment, there is provided a method for producing the lithium ion secondary battery, the method comprising:

loading the metal to be alloyed with the lithium or a compound of the metal on the surface of the carbon fibers by passing the carbon fibers through a first nozzle that is filled with a liquid containing the metal or the compound of the metal, and obtaining the carbon fiber assembly by assembling the metal-loading carbon fibers and passing the assembled carbon fibers through a second nozzle that is filled with a binder solution containing a binder.

According to the disclosed embodiments, the lithium ion secondary battery with enhanced charge-discharge characteristics is provided.

BRIEF DESCRIPTION OF THE DRAWINGS

In the accompanying drawings.

DETAILED DESCRIPTION

The lithium ion secondary battery of the disclosed embodiments is a lithium ion secondary battery comprising:
a columnar anode comprising a carbon fiber assembly having an assembled carbon fiber structure,
a cathode, and
an ion-conducting, insulating separation film disposed between the cathode and the anode to insulate the cathode and the anode from each other,
wherein a void content of the carbon fiber assembly is 20% or more and 40% or less, and
wherein at least one of a lithium metal and a lithium alloy is contained in voids of the carbon fiber assembly, when the lithium ion secondary battery is in a fully charged state.

In the disclosed embodiments, the state of charge (SOC) indicates the percentage of the charged capacity of a secondary battery with respect to the full charge capacity of the secondary battery. The full charge capacity is a SOC of 100%.

For example, the may be estimated from the open circuit voltage (OCV) of the secondary battery. More specifically, it may be estimated as follows: first, data storing the characteristic relationship between the temperature T, current density I, open circuit voltage OCV and SOC of the secondary battery, is prepared; next, the temperature T and current density I of the secondary battery are measured; next, the battery voltage of the secondary battery, which is the voltage between the terminals of the secondary battery, is measured and regarded as the open circuit voltage OCV; and the measured temperature T, current density I and open circuit voltage OCV of the secondary battery are checked against the data, thereby estimating the SOC of the secondary battery.

The methods for measuring the temperature T, current density I and voltage V of the secondary battery are not particularly limited. They may be measured by conventionally known methods.

For a conventional, non-aqueous lithium ion secondary battery, since the non-aqueous liquid electrolyte has lower ion conductivity than an aqueous liquid electrolyte, thin electrodes are used to increase the area of the electrodes and ensure battery input and output.

To achieve a high-capacity, non-aqueous lithium ion secondary battery, it is needed to decrease the content of at least one material other than the electrode active material in each electrode, or it is needed to decrease the void content of the battery. However, a conventional, wound-thin-film-type or laminate-type battery structure has a limitation in decreasing them.

For a laminate-type battery comprising a solid electrolyte, since the ion conductivity of the solid electrolyte is low, especially, ion conduction inside the electrodes is limited, and it is difficult to ensure high battery input and output.

To achieve a high-capacity lithium ion secondary battery, all of the following factors are important: the active material content of the electrodes are high; the facing area between the cathode and anode is large; the ion conductivity of the inside of the electrodes is high; and the active materials have high capacity and high electron conductivity.

To substantially increase the capacity of the secondary battery, it is necessary to use an active material with high volumetric energy density. However, for an anode comprising a conventional carbonaceous material, only the capacity ensured by Li ion insertion and extraction into/from the carbon crystal structure, has been used.

It was studied to increase anode capacity by using, as anode active materials, a carbon fiber assembly and a lithium metal that has higher energy density than the carbon fiber assembly.

It was found that the charge-discharge efficiency of a lithium ion secondary battery is increased by the following factors: the carbon fiber assembly that the void content is controlled to 20% to 40%, is used as the anode active material; the surface of the carbon fiber assembly is covered with the separation film (e.g., a polymer impregnated with a liquid electrolyte); the carbon fiber assembly faces the cathode; and the Li metal is contained in the voids of the carbon fiber assembly, when the lithium ion secondary battery is in a SOC of 100%.

Also, it was found that the charge-discharge efficiency of the lithium ion secondary battery is further increased by loading the metal to be alloyed with the lithium or a compound of the metal on the surface of the carbon fibers constituting the carbon fiber assembly.

The volumetric energy density of the lithium ion secondary battery is largely increased by containing the lithium metal in the voids inside the carbon fiber assembly (serving as the anode) of the lithium ion secondary battery in a SOC of 100%.

This is mainly due to the following factors: the voids of the carbon fiber assembly can be efficiently used, and the lithium metal (capacity: 2061 mAh/cm$^3$) having higher volumetric energy density than a carbonaceous material (capacity: 600 mAh/cm$^3$ to 800 mAh/cm$^3$) is efficiently used.

Meanwhile, for a carbon rod structure not containing carbon fibers, the voids are in such a form that is unsuitable for the deposition of the Li metal, and the Li metal is mainly deposited on the surface of the carbon rod, therefore. Accordingly, the form of the voids of the carbon fiber assembly is considered to be suitable for the deposition of the Li metal.

In the lithium ion secondary battery of the disclosed embodiments, the separation film, which is composed of a gel polymer containing a liquid electrolyte, etc., is disposed on the surface of the carbon fiber assembly to separate the carbon fiber assembly from the cathode. Accordingly, the effect of suppressing the deposition of the lithium metal, which is in a dendrite form, on the electrode surface, is exerted.

Also, the deposition of the Li metal in the voids of the carbon fiber assembly, is frequently caused by loading at least one kind of metal to be alloyed with the lithium or the compound of the at least one kind of metal on the surface of the carbon fibers.

[Lithium Ion Secondary Battery]

Figure 1:
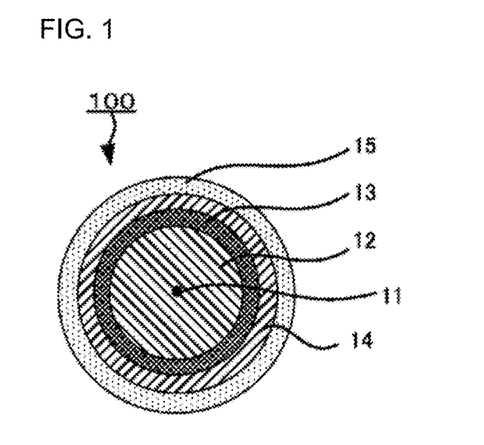
FIG. 1 is a schematic view of an example of a cross section in the direction perpendicular to the longitudinal direction of the lithium ion secondary battery of the disclosed embodiments.

FIG. 1 is a schematic view of an example of a cross section in the direction perpendicular to the longitudinal direction of the lithium ion secondary battery of the disclosed embodiments. In the accompanying drawings, for ease of illustration and understanding, components shown in the figures are appropriately scaled, or the horizontal to vertical dimensional ratio of the components is changed from the actual ratio and enlarged.

As shown in FIG. 1, a lithium ion secondary battery 100 comprises an anode current collector 11, an anode 12, a separation film 13, a cathode 14 and a cathode current collector 15 in this order.

The anode 12 is a round columnar anode that the cross section is in a round shape.

The separation film 13 covers the outer circumferential surface other than the end surfaces of the anode 12, and it is disposed between the cathode 14 and the anode 12 to insulate the cathode 14 and the anode 12 from each other.

For the anode 12, the outer circumferential surface other than the end surfaces in the longitudinal direction faces the cathode 14 through the separation film 13.

For the lithium ion secondary battery of the disclosed embodiments, the ratio of the capacity of the anode to the capacity of the cathode (anode capacity/cathode capacity) may be smaller than 1. Since the anode capacity/cathode capacity value is smaller than 1, the volumetric energy density of the lithium ion secondary battery is increased.

[Cathode]

The cathode comprises a cathode active material. As optional components, the cathode may comprise an electroconductive material, a binder, etc.

The form of the cathode is not particularly limited. The cathode may be a hollow columnar cathode (e.g., a hollow round columnar cathode) or a hollow polygonal columnar cathode, both of which cover, in a cross section of the lithium ion secondary battery, the outer circumferential surface other than the end surfaces of the separation film.

If the cathode is a hollow columnar cathode, it may be such that the length or diameter of a side of a cross section in the direction perpendicular to the longitudinal direction, is 100 µm or more and 1000 µm or less. As long as the length or diameter is in this range, the volumetric energy density of the lithium ion secondary battery is further increased. In addition, as long as the length or diameter is in this range, the transfer distance of ions (serving as a carrier) is further decreased, and the lithium ion secondary battery is charged and discharged with larger current.

The type of the cathode active material is not particularly limited. As the cathode active material, examples include, but are not limited to, a cathode active material represented by the following general formula: $Li_xM_yO_z$ (where M is a transition metal element; x is from 0.02 to 2.2; y is from 1 to 2; and z is from 1.4 to 4). The transition metal element M may be at least one selected from the group consisting of Co, Mn, Ni, V, Fe and Si, or it may be at least one selected from the group consisting of Co, Ni and Mn. As the cathode active material represented by the general formula $Li_xM_yO_z$, examples include, but are not limited to, $LiCoO_2$, $LiMnO_2$, $LiNiO_2$, $LiVO_2$, $LiNi_{1/3}Co_{1/3}Mn_{1/3}O_2$, $LiMn_2O_4$, $Li(Ni_{0.5}Mn_{1.5})O_4$, $Li_2FeSiO_4$ and $Li_2MnSiO_4$.

Cathode active materials other than the one represented by the general formula $Li_xM_yO_z$ include, for example, lithium titivates (such as $Li_4Ti_5O_{12}$), lithium metal phosphates (such as $LiFePO_4$, $LiMnPO_4$, $LiCoPO_4$ and $LiNiPO_4$), transition metal oxides (such as $V_2O_5$ and $MoO_3$), $TiS_2$, LiCoN, Si, $SiO_2$, $Li_2SiO_3$, $Li_4SiO_4$, and lithium storage intermetallic compounds (such as $Mg_2Sn$, $Mg_2Ge$, $Mg_2Sb$ and $Cu_3Sb$).

The form of the cathode active material is not particularly limited. The cathode active material may be in a particulate form, a thin film form, etc. From the viewpoint of handling, it may be a particulate form.

When the cathode active material is in a particulate form, the average particle diameter ($D_{50}$) of the cathode active material particles may be 1 nm or more and 100 µm or less, or it may be 10 nm or more and 30 µm or less, for example.

In the disclosed embodiments, unless otherwise noted, the average particle diameter of particles is a volume-based median diameter ($D_{50}$) measured by laser diffraction/scattering particle size distribution measurement. Also in the disclosed embodiments, the median diameter ($D_{50}$) of particles is a diameter at which, when particles are arranged in ascending order of their particle diameter, the accumulated volume of the particles is half (50%) the total volume of the particles (volume average diameter).

A coating layer containing a Li ion conducting oxide may be formed on the surface of the cathode active material. This is because a reaction between the cathode active material and the solid electrolyte can be suppressed.

As the Li ion conducting oxide, examples include, but are not limited to, $LiNbO_3$, $Li_4Ti_5O_{12}$ and $Li_3PO_4$. For the thickness of the coating layer, the lower limit may be 0.1 nm or more, or it may be 1 nm or more, for example. On the other hand, the upper limit may be 100 nm or less, or it may be 20 nm or less, for example.

As the electroconductive material, a known electroconductive material may be used. As the electroconductive material, examples include, but are not limited to, a carbonaceous material and metal particles. The carbonaceous material may be at least one selected from the group consisting of carbon nanotube, carbon nanofiber and carbon blacks such as acetylene black (AB) and furnace black. Of them, from the viewpoint of electron conductivity, the electroconductive material may be at least one selected from the group consisting of carbon nanotube and carbon nanofiber. The carbon nanotube and carbon nanofiber may be vapor-grown carbon fiber (VGCF). As the metal particles, examples include, but are not limited to, particles of Ni, particles of Cu, particles of Fe and particles of SUS.

The content of the electroconductive material in the cathode is not particularly limited.

The binder used in the cathode functions to keep the cathode active material and the electroconductive material and retain the predetermined form. As the binder, examples include, but are not limited to, carboxymethyl cellulose (CMC); polyvinyl alcohol (PVA); polyethylene glycol (PEG); polytetrafluoroethylene (PTFE); polyvinylidene fluoride (PVdF); copolymer of polyvinylidene fluoride (PVdF) and hexafluoropropylene (HFP); fluorine-containing resin such as fluorine rubber; thermoplastic resin such as polypropylene and polyethylene; ethylene propylene diene monomer (EPDM) rubber; sulfonated EPDM rubber; and natural butyl rubber (NBR). They may be used alone or in combination. As the binder, examples also include, but are not limited to, aqueous dispersions of aqueous binders such as celluloses and styrene butadiene rubber (SBR).

From the viewpoint of increasing the volumetric energy density of the cathode, the content of the cathode active material in the cathode may be 70 volume % or more, or it may be 80 volume % or more, with respect to the total volume of the cathode.

The content of the electroconductive material in the cathode may be in a range of from 0 volume % to 20 volume %, or it may be in a range of from 0 volume % to 15 volume %, with respect to the total volume of the cathode. As long as the content of the electroconductive material is in this range, a decrease in the capacity of the lithium ion secondary battery is suppressed, the lithium ion secondary battery obtains sufficient elect roconductivity.

The content of the binder in the cathode may be in a range of from 0.1 volume % to 5 volume %, with respect to the total volume of the cathode. From the viewpoint of increasing the volumetric energy density of the cathode, it may be in a range of from 0.2 volume % to 1 volume %.

When the cathode is in a layer form, the thickness of the cathode is not particularly limited. For example, it may be from 10 μm to 250 μm, or it may be from 20 μm to 200 μm.

[Cathode Current Collector]

As needed, the lithium ion secondary battery of the disclosed embodiments comprises a cathode current collector.

As the cathode current collector, a conventionally-known metal that is usable as a current collector in lithium ion secondary batteries, may be used. As the metal, examples include, but are not limited to, a metal material containing one or more elements selected from the group consisting of Cu, Ni, Al, V, Au, Pt, Mg, Fe, Ti, Co, Cr, Zn, Ge and In. For the purpose of increasing adhesion, electroconductivity and resistance to oxidation (reduction), aluminum or copper may be coated with carbon, nickel, titanium, silver, platinum, gold or the like and used as the cathode current collector.

The form of the cathode current collector is not particularly limited. As the form, examples include, but are not limited to, various kinds of forms such as a foil form and a mesh form.

[Anode]

As an anode active material, the anode comprises the carbon fiber assembly having the assembled carbon fiber structure (hereinafter, it may be referred to as CFA). As optional components, the anode may comprise an electroconductive material, a binder, etc. A carbonaceous material other than the carbon fibers may be also contained in the anode.

The anode may be a columnar anode; the anode may be a round columnar anode that the cross section is round or elliptical, or a polygonal columnar anode that the cross section is square, hexagon or the like; or the anode may be a polygonal columnar anode that the length of a side of the cross section in the direction perpendicular to the longitudinal direction, is 30 μm or more and 1000 μm or less, or a round columnar anode that the diameter of the cross section (the long diameter when the cross section is elliptical) in the direction perpendicular to the longitudinal direction, is 30 μm or more and 1000 μm or less.

As long as the length of a side or the diameter is 30 μm or more, the desired anode active material amount can be ensured. The length of a side or the diameter may be 1000 μm or less, since an increase in the ion diffusion resistance of the anode is further suppressed.

For the anode, the outer circumferential surface other than the end surfaces in the longitudinal direction may face the cathode through the separation film.

The void content of the carbon fiber assembly is 20% or more and 40% or less, and at least one of the lithium metal and the lithium alloy is contained in the voids of the carbon fiber assembly, when the lithium ion secondary battery is in a fully charged state.

The void content of the carbon fiber assembly may be obtained as follows: the carbon fiber assembly is subjected to cross-sectional processing by ion milling; a cross section thus obtained of the carbon fiber assembly is observed with a secondary electron microscope; and the void content of the cross section is calculated, thereby obtaining the void content of the carbon fiber assembly. Also, the void content of the carbon fiber assembly may be obtained as follows: multiple cross sections of the carbon fiber assembly are observed with a secondary electron microscope; the void content of each cross section is calculated; and the average of the void contents thus calculated is determined as the void content of the carbon fiber assembly.

The carbon fibers constituting the carbon fiber assembly may be selected from commercially-available carbon fiber products.

As the carbon fiber products, examples include, but are not limited to, YS-90A-10S (product name, manufactured by Nippon Graphite Fiber Corporation). The cross-sectional diameter of the carbon fibers may be from 5 μm to 100 μm. The length of the carbon fibers may be from 50 mm to 500 mm, or it may be from 100 mm to 300 mm. The number of the carbon fibers constituting the carbon fiber assembly may be 10 to 6800.

At least one of a lithium metal and a lithium alloy is contained in the voids of the carbon fiber assembly, when the lithium ion secondary battery of the disclosed embodiments is in a fully charged state (a SOC of 100%).

Figure 2:
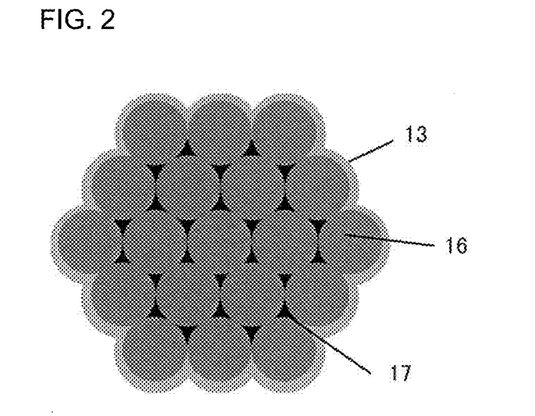
FIG. 2 is a schematic view of an example of a cross section in the direction perpendicular to the longitudinal direction of the carbon fiber assembly and the separation film covering the outer circumferential surface of the carbon fiber assembly, when the lithium ion secondary battery is in a fully charged state.

FIG. 2 is a schematic view of an example of a cross section in the direction perpendicular to the longitudinal direction of a carbon fiber assembly and a separation film covering the outer circumferential surface of the carbon fiber assembly, when the lithium ion secondary battery is in a fully charged state.

As shown in FIG. 2, the separation film 13 covers the outer circumferential surface of a carbon fiber assembly 16, and a lithium metal 17 is present in the voids of the carbon fiber assembly 16.

A metal to be alloyed with the lithium contained in the lithium alloy, may be at least one kind of metal selected from the group consisting of gold, platinum, magnesium, zinc, tungsten, molybdenum, aluminum, gallium, indium, silicon, germanium, tin, lead, arsenic, antimony and bismuth.

As the electroconductive material and binder contained in the anode, examples include, but are not limited to, those exemplified above as the materials for the cathode. As the carbonaceous material other than the carbon fibers contained in the anode, examples include, but are not limited to, graphite, acetylene black, carbon black, Ketjen Black, carbon whisker and needle coke.

The anode may be produced as follows, for example: a predetermined number of carbon fibers with a predetermined diameter and a predetermined length, are assembled; the assembled carbon fibers are passed through a nozzle that is filled with a binder solution; the assembled carbon fibers wet with the binder solution are dried, thereby producing the anode.

[Anode Current Collector]

As needed, the lithium ion secondary battery of the disclosed embodiments comprises an anode current collector.

As the anode current collector, examples include, but are not limited to, those exemplified above as the material for the cathode current collector.

The form of the anode current collector is not particularly limited. The anode current collector may be such a round columnar anode current collector, that the cross section in the direction perpendicular to the longitudinal direction is in a round shape.

The anode current collector may be embedded in the anode, and the anode current collector embedded in the anode may extend to the outside for current collection. For the diameter of the cross section in the direction perpendicular to the longitudinal direction of the anode current collector, the upper limit may be 50 μm or less, may be 40 μm or less, or may be 30 μm or less, for example.

The lower limit may be 1 μm or more, may be 5 μm or more, or may be 10 μm or more, for example. From the viewpoint of increasing the energy density per unit volume of the lithium ion secondary battery, the diameter of the cross section in the direction perpendicular to the longitudinal direction of the anode current collector may be as small as possible, as long as electroconductivity is ensured.

[Separation Film]

The separation film functions to insulate the cathode and the anode from each other, while maintaining lithium ion (carrier) conductivity.

From the viewpoint of suppressing short circuits in the lithium ion secondary battery, the separation film may be formed on the whole outer circumferential surface of the anode facing the cathode.

The separation film may be an insulating polymer impregnated with an ion-conducting medium, or it may be a solid electrolyte.

By impregnating the polymer with the ion-conducting medium, the ion-conducting medium is partially gelled.

As the polymer, examples include, but are not limited to, a copolymer of polyvinylidene fluoride (PVdF) and hexafluoropropylene (HFP), polymethyl methacrylate (PMMA), and a copolymer of PMMA and acrylic resin.

As the ion-conducting medium, examples include, but are not limited to, an electrolyte obtained by dissolving a supporting salt in a solvent.

As the solvent of the electrolyte, examples include, but are not limited to, solvents of non-aqueous liquid electrolytes, such as carbonates, esters, ethers, nitriles, furans, sulfolanes and dioxolans. They may be used alone or in combination.

As the carbonates, examples include, but are not limited to, cyclic carbonates such as ethylene carbonate (EC), propylene carbonate, vinylene carbonate, butylene carbonate and chloroethylene carbonate, and chain carbonates such as dimethyl carbonate (DMC), ethyl methyl carbonate (EMC), diethyl carbonate, ethyl-n-butyl carbonate, methyl-t-butyl carbonate, di-i-propyl carbonate and t-butyl-i-propyl carbonate.

As the esters, examples include, but are not limited to, cyclic esters such as γ-butyrolactone and γ-valerolactone, and chain esters such as methyl formate, methyl acetate, ethyl acetate and methyl butyrate.

As the ethers, examples include, but are not limited to, dimethoxyethane, ethoxymethoxyethane and diethoxyethane.

As the nitriles, examples include, but are not limited to, acetonitrile and benzonitrile.

As the furans, examples include, but are not limited to, tetrahydrofuran and methyltetrahydrofuran.

As the sulfolanes, examples include, but are not limited to, sulfolane and tetramethylsulfolane.

As the dioxolans, examples include, but are not limited to, 1,3-dioxolan and methyldioxolan.

As the supporting salt, examples include, but are not limited to, $LiPF_6$, $LiBF_4$, $LiAsF_6$, $LiCF_3SO_3$, $LiN(CF_3SO_2)_2$, $LiC(CF_3SO_2)_3$, $LiSbF_6$, $LiSiF_6$, $LiAlF_4$, LiSCN, $LiClO_4$, LiCl, LiF, LiBr, LiI and $LiAlCl_4$. Of them, one or more kinds of salts selected from inorganic salts such as $LiPF_6$, $LiBF_4$ and $LiClO_4$ and organic salts such as $LiCF_3SO_3$, $LiN(CF_3SO_2)_2$ and $LiC(CF_3SO_2)_3$ may be used in combination.

The concentration of the supporting salt in the electrolyte may be 0.1 mol/L or more and 5 mol/L or less, or it may be 0.5 mol/L or more and 2 mol/L or less.

As the solid electrolyte, examples include, but are not limited to, an inorganic solid electrolyte, a mixture of an organic polymer electrolyte and an inorganic solid electrolyte, and an inorganic solid powder formed into a film by attaching the powder particles with an organic binder.

As the inorganic solid electrolyte, examples include, but are not limited to, a sulfide-based solid electrolyte and an oxide-based solid electrolyte.

As the sulfide-based solid electrolyte, examples include, but are not limited to, $Li_2S$—$P_2S_5$, $Li_2S$—$SiS_2$, LiX—$Li_2S$—$SiS_2$, LiX—$Li_2S$—$P_2S_5$, LiX—$Li_2O$—$Li_2S$—$P_2S_5$, LiX—$Li_2S$—$P_2O_5$, LiX—$Li_3PO_4$—$P_2S_5$ and $Li_3PS_4$. The "$Li_2S$—$P_2S_5$" means a material composed of a raw material composition containing $Li_2S$ and $P_2S_5$, and the same applies to other solid electrolytes. Also, "X" in the "LiX" means a halogen element. The LiX contained in the raw material composition may be one or more kinds. When two or more kinds of LiX are contained in the raw material composition, the mixing ratio is not particularly limited.

As the oxide-based solid electrolyte, examples include, but are not limited to, $Li_{6.25}La_3Zr_2Al_{0.25}O_{12}$, $Li_3PO_4$, and $Li_{3+x}PO_{4-x}N_x$ (LiPON).

From the viewpoint of ensuring the insulation between the cathode and the anode, the thickness of the separation film may be 0.5 μm or more, may be 2 μm or more, or may be 5 μm or more. From the viewpoint of increasing ion conductivity, the thickness of the separation film may be 20 μm or less, or it may be 10 μm or less.

The content (%) of the electrolyte in the separation film is not particularly limited. When the total volume of the separation film is determined as 100 volume %, the lower limit of the electrolyte content may be 0 volume % or more, and the upper limit may be 50 volume % or less, for example.

[Others]

As needed, the lithium ion secondary battery comprises an outer casing for housing the cathode, the anode and the separation film.

The form of the outer casing is not particularly limited. As the form, examples include, but are not limited to, a laminate form.

The material for the outer casing is not particularly limited, as long as it is a material that is stable in electrolytes. As the material, examples include, but are not limited to, resins such as polypropylene, polyethylene and acrylic resin.

As the form of the lithium ion secondary battery, examples include, but are not limited to, a coin form, a laminate form, a cylindrical form and a square form.

A plurality of the lithium ion secondary batteries may be stacked to form a battery assembly. The number of the stacked lithium ion secondary batteries is not particularly limited and may be 2 to 50.

[Lithium Ion Secondary Battery Production Method]

The lithium ion secondary battery production method of the disclosed embodiments is a method for producing the lithium ion secondary battery of the disclosed embodiments, the method comprising:

loading the metal to be alloyed with the lithium or a compound of the metal on the surface of the carbon fibers by passing the carbon fibers through a first nozzle that is filled with a liquid containing the metal or the compound of the metal, and obtaining the carbon fiber assembly by assembling the metal-loading carbon fibers and passing the assembled carbon fibers through a second nozzle that is filled with a binder solution containing a binder.

The lithium ion secondary battery production method of the disclosed embodiments comprises (1) the metal loading step and (2) the carbon fiber assembling step. In general, the production method further comprises (3) a separation film forming step and (4) a cathode forming step.

(1) The Metal Loading Step

The metal loading step is a step of loading the metal to be alloyed with the lithium (deposited nuclei) or the compound of the metal on the surface of the carbon fibers by passing the carbon fibers through a first nozzle that is filled with a liquid containing the metal or the compound of the metal.

By loading the metal to be alloyed with the lithium or the compound of the metal on the surface of the carbon fibers, the metal serves as a lithium deposition starting point. As a result, lithium easily deposits in the voids between the carbon fibers of the carbon fiber assembly formed by assembling the carbon fibers, and the volumetric energy density of the anode is further increased.

The amount of the metal loaded on the surface of the carbon fibers or the amount of the compound of the metal is not particularly limited. From the viewpoint of increasing the lithium ion secondary battery charge and discharge efficiency, the whole surface of the carbon fibers may be covered with the metal or with the compound of the metal.

The liquid containing the metal to be alloyed with the lithium or the compound of the metal may be a dispersion obtained by dispersing the metal or the compound of the metal in a solvent, or it may be a dissolved solution obtained by dissolving the metal or the compound of the metal in a solvent.

As the metal to be alloyed with the lithium, examples include, but are not limited to, the metal contained in the lithium alloy contained in the voids of the carbon fiber assembly of the above-described lithium ion secondary battery in a SOC of 100%.

The solvent may be appropriately selected depending on the type of the metal used.

For example, when the metal is Au, water may be used as the solvent.

When the metal is Zn, ZnO may be used as a compound of Zn, and ethanol may be used as the solvent.

As the first nozzle, for example, a pipette tip may be used.

(2) The Carbon Fiber Assembling Step

The carbon fiber assembling step is a step of obtaining the carbon fiber assembly by assembling the metal-loading carbon fibers and passing the assembled carbon fibers through a second nozzle that is filled with a binder solution containing a binder.

As the binder, examples include, but are not limited to, those exemplified above as the binder used in the cathode.

A solvent is used to prepare the binder solution. The solvent may be appropriately selected depending on the type of the binder. For example, when PVDF-HFP is used as the binder, a binder dispersion with a solid content of 8 mass % may be prepared by using NMP as the solvent.

The cross-sectional diameter of the carbon fiber assembly and the void content of the carbon fiber assembly may be controlled by controlling the outlet diameter of the second nozzle.

As the second nozzle, for example a pipette tip may be used.

At the time of assembling the carbon fibers, an anode current collecting wire, which serves as the anode current collector, and the carbon fibers may be assembled together, thereby disposing the anode current collector in the carbon fiber assembly thus obtained.

(3) The Separation Film Forming Step

The separation film forming step is a step of forming the separation film on the surface of the carbon fiber assembly.

The separation film may be formed on the surface of the carbon fiber assembly by the following method, for example: first, a solution containing the polymer (a raw material for the separation film) and, as needed, a liquid electrolyte is prepared; the carbon fiber assembly is immersed in the solution to cover the surface of the carbon fiber assembly with the solution; and the solution covering the carbon fiber assembly is dried, thereby forming the separation film. Also, the separation film may be formed by applying the solution to the carbon fiber assembly and drying the applied solution.

The carbon fiber assembly may be formed on the whole surface of the carbon fiber assembly. When the anode current collecting wire is disposed in the carbon fiber assembly, the separation film may be formed on the surface of the carbon fiber assembly, excluding the anode current collector. Also, the separation film may be formed on the whole surface of the carbon fiber assembly, and then the separation film in the position where the anode current collector is disposed, may be removed. Also, the separation film may be formed by applying the solution to the outer circumferential surface other than the end surfaces in the longitudinal direction of the carbon fiber assembly, and drying the applied solution.

The method for forming the separation film is not particularly limited. For example, an electrodeposition method, a dip coating method, a spray coating method or a self-supporting film method may be used.

(4) The Cathode Forming Step

The cathode forming step is a step of forming the cathode on the separation film.

The cathode may be formed on the separation film by the following method, for example: first, the cathode active material, the electroconductive material and the binder are added to a solvent; they are mixed together to produce a cathode slurry; the cathode slurry is applied on the separation film; the applied cathode slurry is dried, thereby obtaining the cathode.

As the solvent, examples include, but are not limited to, toluene and methyl ethyl ketone (MEK).

The method for applying the cathode slurry is not particularly limited. As the method, examples include, but are not limited to, a doctor blade method, a metal mask printing method, an electrostatic coating method, a dip coating method, a spray coating method, a roller coating method, a gravure coating method and a screen printing method.

As needed, the cathode current collector is disposed at the predetermined position of the cathode, thereby producing the lithium ion secondary battery.

EXAMPLES

Example 1

[Preparation of the Carbon Fiber Assembly]

A carbon fiber yarn (product name: YS-90A-10S, manufactured by: Nippon Graphite Fiber Corporation) was used.

As the binder solution, a solution was obtained by dissolving (dispersing) polyvinylidene fluoride and hexafluoropropylene (PVDF-HFP) in an N-methylpyrrolidone solvent. The solid content (binder content) of the binder solution was 8 mass %. The binder solution was added to a nozzle 1 that the tip diameter was controlled to 300 microns.

Then, the carbon fiber yarn was wet with the binder solution by passing the carbon fiber yarn through the nozzle 1 filled with the binder solution. The wet carbon fiber yarn was dried, thereby obtaining a carbon fiber assembly that the cross section was a round cross section. The diameter of the nozzle 1 through which the carbon fiber yarn was passed, was controlled to ensure that the void content of the carbon fiber assembly was 30%.

The diameter of the cross section of the carbon fiber assembly was 250 μm.

[Formation of the Separation Film]

A copolymer of polyvinylidene fluoride and hexafluoropropylene (PVDF-HFP) was used as the polymer.

A solution was obtained by dissolving PVDF-HFP in an acetone solvent. The carbon fiber assembly was immersed in the solution. The surface of the carbon fiber assembly was covered with the polymer by an electrodeposition method. The thickness of the polymer on the surface was controlled to 5 μm.

Then, the polymer was impregnated with a liquid electrolyte, thereby obtaining the separation film.

As the liquid electrolyte, a liquid electrolyte obtained by dissolving $LiPF_6$, which served as the supporting salt, in a mixed solvent of EC and EMC, which served as the solvent, was used.

[Cross-Sectional Observation of the Carbon Fiber Assembly (Quantitative Determination of the Void Content and the Number of the Voids)]

The carbon fiber assembly was subjected to cross-sectional processing by ion milling, and a cross section thus obtained of the carbon fiber assembly was observed with a secondary electron microscope.

Figure 3:
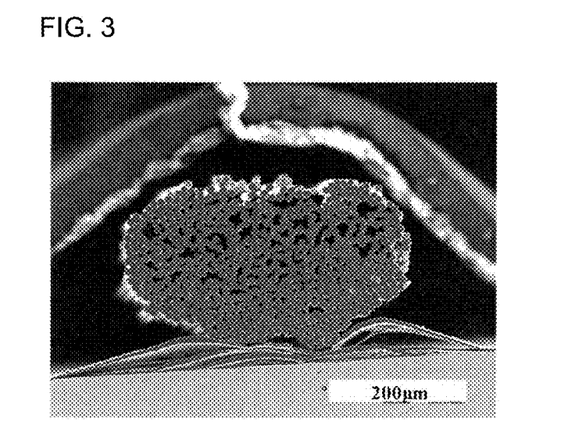
FIG. 3 is a SEM image of a cross section in the direction perpendicular to the longitudinal direction of the carbon fiber assembly of Example 1.

FIG. 3 is a scanning electron microscope (SEM) image of a cross section in the direction perpendicular to the longitudinal direction of the carbon fiber assembly of Example 1.

Figure 4:
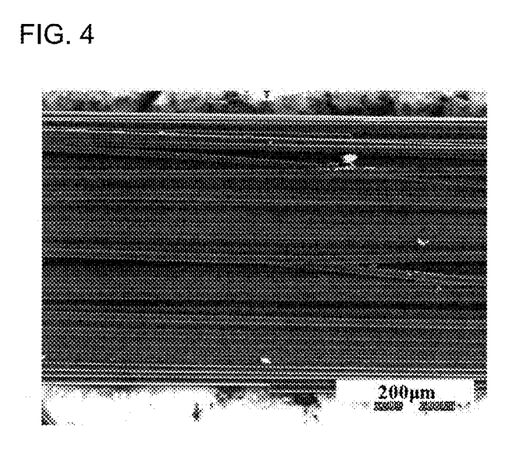
FIG. 4 is a SEM image of the surface in the longitudinal direction of the carbon fiber assembly of Example 1.

FIG. 4 is a SEM image of the surface in the longitudinal direction of the carbon fiber assembly of Example 1.

Based on the thus-obtained observation images (1000×), the carbon fibers and voids of the carbon fiber assembly were binarized. Then, the void content of the carbon fiber assembly and the number of the voids were calculated. Also, the void diameters of the voids were measured under the assumption that the voids were spherical. The average void diameter was calculated therefrom. The results are shown in Table 1.

[Cross-Sectional Observation of the Carbon Fiber Assembly (Cross-Sectional Observation of the Charged Anode)]

An evaluation cell was produced by using the carbon fiber assembly as a working electrode, the separation film as an electrolyte, and a lithium metal foil as a counter electrode. The evaluation cell was charged. Then, when the evaluation cell was in a SOC of 100%, the carbon fiber assembly was subjected to cross-sectional processing by ion milling, and a cross section thus obtained of the carbon fiber assembly was observed with the secondary electron microscope.

[Evaluation of the Charge-Discharge Characteristics of the Evaluation Cell Used as the Counter Electrode Li Metal]

To collect current from an end in the longitudinal direction of the carbon fiber assembly serving as the working electrode, a nickel paste was applied to the end of the carbon fiber assembly, and the end was connected to a nickel tab through the applied nickel paste.

The lithium metal foil serving as the counter electrode was disposed to face the carbon fiber assembly through the separation film, thereby obtaining an evaluation cell.

Next, the evaluation cell was charged and discharged in a potential range of from 0.005 V vs. $Li^+/Li$ to 1.5 V vs. $Li^+/Li$.

Next, the evaluation cell was charged with constant current to a capacity of 600 mAh/g per mass of the carbon fibers. Then, the evaluation cell was discharged with constant current to 1.5 V. The charge-discharge efficiency of the evaluation cell was calculated. The result is shown in Table 1.

The carbon fibers used in the evaluation cell showed a capacity of 300 mAh/g in a normal charge and discharge range (from 0.005 V vs. $Li^+/Li$ to 1.5 V vs. Li+/Li). Accordingly, a capacity of 600 mAh/g corresponds to twice the capacity of the carbon fibers. That is, under the assumption that the capacity of the Li metal deposited in the voids of the carbon fiber assembly is 300 mAh/g per mass of the carbon fibers, a capacity of 600 mAh/g is the total capacity of the capacity of the carbon fibers and that of the Li metal, and using the total capacity as the theoretical capacity of the evaluation cell, the charge-discharge efficiency was calculated from the ratio of the charge capacity to the theoretical capacity (600 mAh/g).

Example 2

The carbon fiber assembly of Example 2 was prepared in the same manner as Example 1, except that in "Preparation of the carbon fiber assembly", before the carbon fibers were passed through the nozzle 1 filled with the binder solution, the carbon fibers were passed through a nozzle 2 filled that was with a dispersion (a water solvent) containing Au particles, thereby loading the Au particles on the carbon fiber surface. The thus-obtained carbon fiber assembly was evaluated in the same manner as Example 1.

Figure 5:
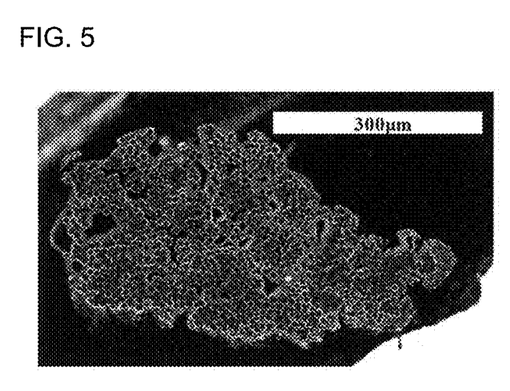
FIG. 5 is a SEM image of a cross section in the direction perpendicular to the longitudinal direction of the carbon fiber assembly of the evaluation cell of Example 2, when the evaluation cell was in a SOC of 100%.

FIG. 5 is a SEM image of a cross section in the direction perpendicular to the longitudinal direction of the carbon fiber assembly of the evaluation cell of Example 2, when the evaluation cell was in a SOC of 100%.

Figure 6:
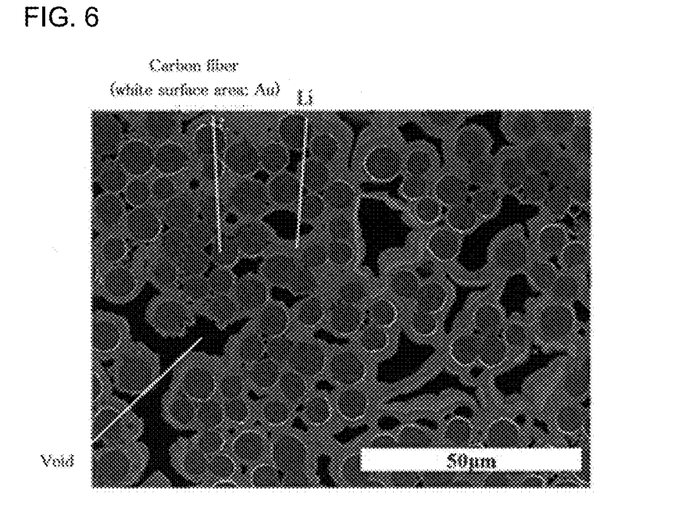
FIG. 6 is a SEM image of a cross section in the direction perpendicular to the longitudinal direction of the carbon fiber assembly of the evaluation cell of Example 2, when the evaluation cell was in a SOC of 100%.

FIG. 6 is a SEM image of a cross section in the direction perpendicular to the longitudinal direction of the carbon fiber assembly of the evaluation cell of Example 2, when the evaluation cell was in a SOC of 100%.

Example 3

The carbon fiber assembly of Example 3 was prepared in the same manner as Example 1, except that in "Preparation of the carbon fiber assembly", before the carbon fibers were passed through the nozzle 1 filled with the binder solution, the carbon fibers were passed through a nozzle 3 that was filled with a dispersion (an ethanol solvent) containing ZnO particles, thereby loading the ZnO particles on the carbon fiber surface. The thus-obtained carbon fiber assembly was evaluated in the same manner as Example 1.

Example 4

The carbon fiber assembly of Example 4 was prepared in the same manner as Example 1, except that in "Preparation of the carbon fiber assembly", the diameter of the nozzle 1 through which the carbon fibers were passed, was controlled to ensure that void content of the carbon fiber assembly was 20%. The thus-obtained carbon fiber assembly was evaluated in the same manner as Example 1.

Example 5

The carbon fiber assembly of Example 5 was prepared in the same manner as Example 1, except that in "Preparation of the carbon fiber assembly", the diameter of the nozzle 1 through which the carbon fibers were passed, was controlled to ensure that the void content of the carbon fiber assembly was 40%. The thus-obtained carbon fiber assembly was evaluated in the same manner as Example 1.

Comparative Example 1

The carbon fiber assembly of Comparative Example 1 was prepared in the same manner as Example 1, except that in "Preparation of the carbon fiber assembly", the carbon fiber assembly was prepared and passed through a nozzle 4 that was filled with a phenolic resin dispersion (product name: TS-10, manufactured by: Asahi Organic Chemicals Industry Co., Ltd.) to fill the voids of the carbon fiber assembly with the phenolic resin, and the phenolic resin contained in the voids of the carbon fiber assembly was carbonized by heating the carbon fiber assembly in an Ar atmosphere at 1000° C. to ensure that the void content of the carbon fiber assembly was 1%. The thus-obtained carbon fiber assembly was evaluated in the same manner as Example 1.

Comparative Example 2

The carbon fiber assembly of Comparative Example 2 was prepared in the same manner as Example 1, except that in "Preparation of the carbon fiber assembly", the diameter of the nozzle 1 through which the carbon fibers were passed, was controlled to ensure that the void content of the carbon fiber assembly was 50%. The thus-obtained carbon fiber assembly was evaluated in the same manner as Example 1.

Comparative Example 3

A carbon rod was formed as follows: flaky graphite particles, which served as an anode active material, and a copolymer of polyvinylidene fluoride-hexafluoropropylene (PVDF-HFP), which served as a polymer, were mixed to produce a mixture; the mixture was subjected to extrusion molding to obtain a molded product; the molded product was heated, thereby forming the carbon rod of Comparative Example 3.

Since the void content of the carbon rod was 13% and low, the voids of the carbon rod were widened by inserting sulfuric acid in the carbon rod and then extracting the inserted sulfuric acid. As a result, the carbon rod with a void content of 23% was obtained. The thus-obtained carbon rod was evaluated in the same manner as Example 1.

Figure 7:
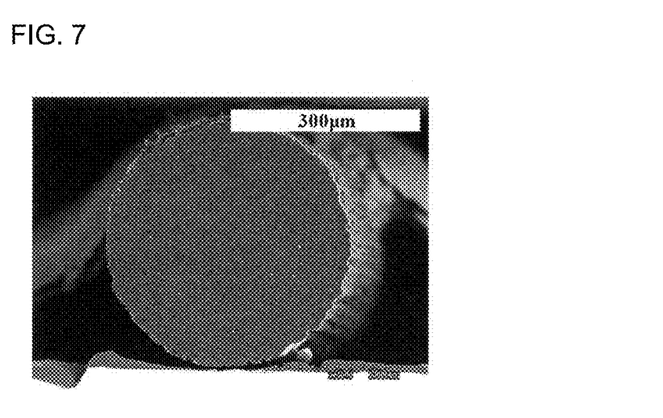
FIG. 7 is a SEM image of a cross section in the direction perpendicular to the longitudinal direction of the carbon rod of the evaluation cell of Comparative Example 3, when the evaluation cell was in a SOC of 100%.

FIG. 7 is a SEM image of a cross section in the direction perpendicular to the longitudinal direction of the carbon rod of the evaluation cell of Comparative Example 3, when the evaluation cell was in a SOC of 100%.

Figure 8:
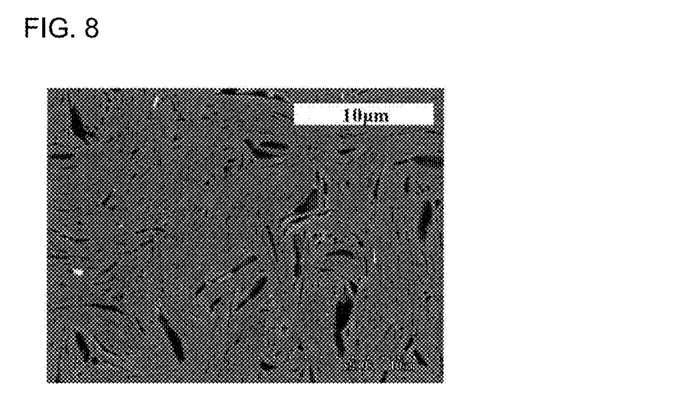
FIG. 8 is a SEM image of a cross section in the direction perpendicular to the longitudinal direction of the carbon rod of the evaluation cell of Comparative Example 3, when the evaluation cell was in a SOC of 100%.

FIG. 8 is a SEM image of a cross section in the direction perpendicular to the longitudinal direction of the carbon rod of the evaluation cell of Comparative Example 3, when the evaluation cell was in a SOC of 100%.

Figure 9:
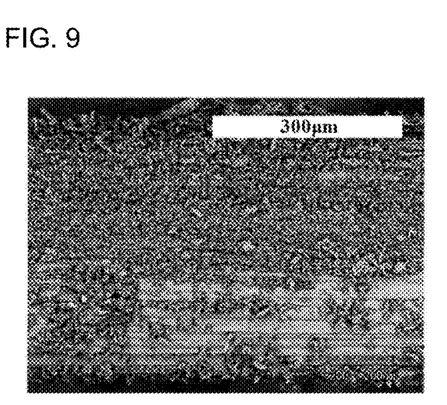
FIG. 9 is a SEM image of a surface in the longitudinal direction of the carbon rod of the evaluation cell of Comparative Example 3, when the evaluation cell was in a SOC of 100%.

FIG. 9 is a SEM image of the surface in the longitudinal direction of the carbon rod of the evaluation cell of Comparative Example 3, when the evaluation cell was in a SOC of 100%.

In the case of using the carbon fiber assembly, as shown in FIGS. 5 and 6, the Li metal was uniformly deposited on the carbon fiber surface, in the voids of the carbon fiber assembly.

Meanwhile, in the case of using the carbon rod (Comparative Example 3), as shown in FIGS. 7 to 9, the Li metal was mainly deposited on the surface of the rod. Li metal deposition did not occur in the voids, and the Li metal, which was in a needle form, was partially found on the rod surface.

Accordingly, in the case of using the carbon rod, the evaluation cell is considered to have low charge-discharge efficiency.

This difference is due to a difference in the void form. In the carbon fiber assembly, the voids are large in size, and they are in a continuous form. In the carbon rod, the voids are small, and they are not continuous.

Accordingly, in the case of using the carbon rod, the Li metal deposition on the carbon rod surface is considered to be due to a shortage of lithium ion supply paths and a shortage of room for Li metal deposition.

TABLE 1

| | Type of Carbonaceous material | Void content (%) of carbonaceous material | Number of voids | Average void diameter (nm) | Deposited nuclei | Charge-discharge efficiency (%) based on 600 mAh/g |
|---|---|---|---|---|---|---|
| Example 1 | Carbon fiber assembly | 30 | 526 | 28.4 | — | 92 |
| Example 2 | Carbon fiber assembly | 30 | 536 | 28.2 | Au | 95 |
| Example 3 | Carbon fiber assembly | 30 | 650 | 25.6 | ZnO | 94 |
| Example 4 | Carbon fiber assembly | 20 | 916 | 17.6 | — | 91 |
| Example 5 | Carbon fiber assembly | 40 | 263 | 46.4 | — | 89 |
| Comparative Example 1 | Carbon fiber assembly | 1 | 1231 | 3.4 | — | 51 |
| Comparative Example 2 | Carbon fiber assembly | 50 | 142 | 70.6 | — | 72 |

TABLE 1-continued

| | Type of Carbonaceous material | Void content (%) of carbonaceous material | Number of voids | Average void diameter (nm) | Deposited nuclei | Charge-discharge efficiency (%) based on 600 mAh/g |
|---|---|---|---|---|---|---|
| Comparative Example 3 | Carbon rod | 23 | 22610 | 3.8 | — | 53 |

For the evaluation cells each comprising the anode in which the void content of the carbon fiber assembly was controlled to 20% to 40%, the charge-discharge efficiencies are higher than the evaluation cells each comprising the anode in which the void content of the carbon fiber assembly was not in the range of from 20% to 40%.

When the void content of the carbon fiber assembly is lower than 20%, the charge-discharge efficiency of the evaluation cell is low. This is considered to be due to a shortage of the voids for Li metal deposition in the carbon fiber assembly and a shortage of lithium ion transporting paths resulting from the impregnation of the carbon fiber assembly with the liquid electrolyte.

The charge-discharge efficiency of the evaluation cell is also low when the void content of the carbon fiber assembly is higher than 40%. This is considered to be because the contact between the carbon fibers of the carbon fiber assembly was decreased to cause a variation in reactivity inside the carbon fiber assembly, or because the deposited lithium metal was deactivated since the voids of the carbon fiber assembly were too large.

From the results of Examples 2 and 3, it was revealed that when Au or ZnO, both of which are possible starting points of lithium metal deposition, is loaded on the carbon fiber surface, the charge-discharge efficiency of the evaluation cell is further increased.

From the results of Comparative Example 3, the following was revealed: for the evaluation cell comprising the anode in which the void content of the carbon rod is controlled to 23%, the charge-discharge efficiency is low. This is considered to be because the average void diameter of the voids of the carbon rod is small.

From the above results, the following was revealed. By using, in the lithium ion secondary battery, the anode comprising the carbon fiber assembly that the void content is controlled to 20% to 40%, the capacity of the Li metal is used; the charge-discharge efficiency of the lithium ion secondary battery is largely increased; the lithium ion secondary battery obtains high energy density; the ratio of the cathode capacity and the anode capacity is decreased; and the robustness of the lithium ion secondary battery is increased.

[Estimation of the Volumetric Energy Density of the Evaluation Cell]

For the evaluation cell comprising the anode in which the void content of the carbon fiber assembly of Example 1 was 30%, the volumetric energy density of the cell in the case of controlling the ratio of the capacity of the anode to the capacity of the cathode (anode capacity/cathode capacity) was estimated. The results are shown in Table 2.

Figure 10:
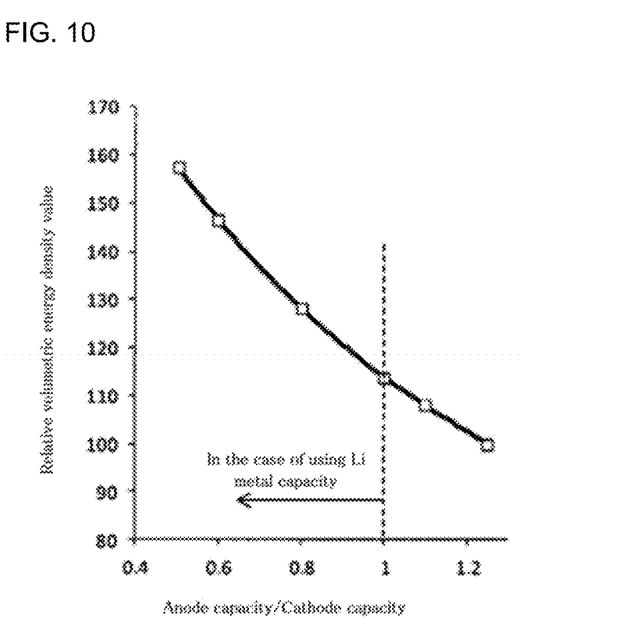
FIG. 10 is a view showing a relationship between, for the evaluation cell of Example 1, the anode capacity/cathode capacity value and the relative volumetric energy density value.

FIG. 10 is a view showing a relationship between, for the evaluation cell of Example 1, the anode capacity/cathode capacity value and the relative volumetric energy density value.

Figure 11:
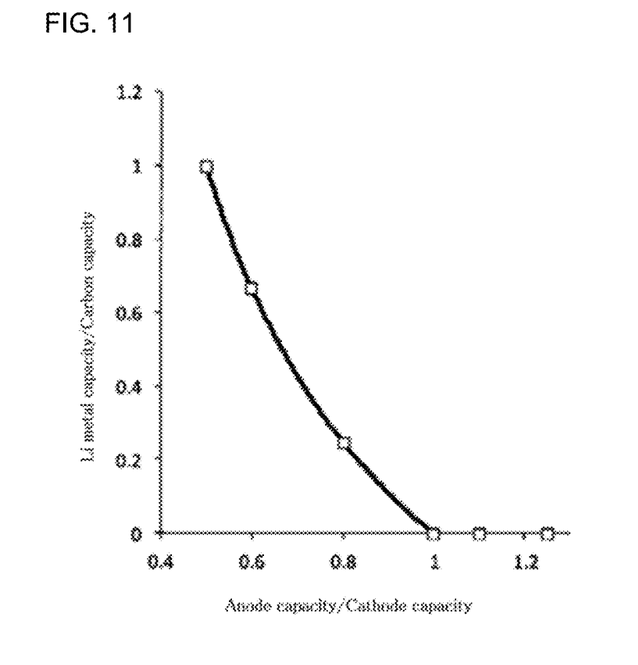
FIG. 11 is a view showing a relationship between, for the evaluation cell of Example 1, the anode capacity/cathode capacity value and the Li metal capacity/carbon (C) capacity value.

FIG. 11 is a view showing a relationship between, for the evaluation cell of Example 1, the anode capacity/cathode capacity value and the Li metal capacity/carbon (C) capacity value.

Figure 12:
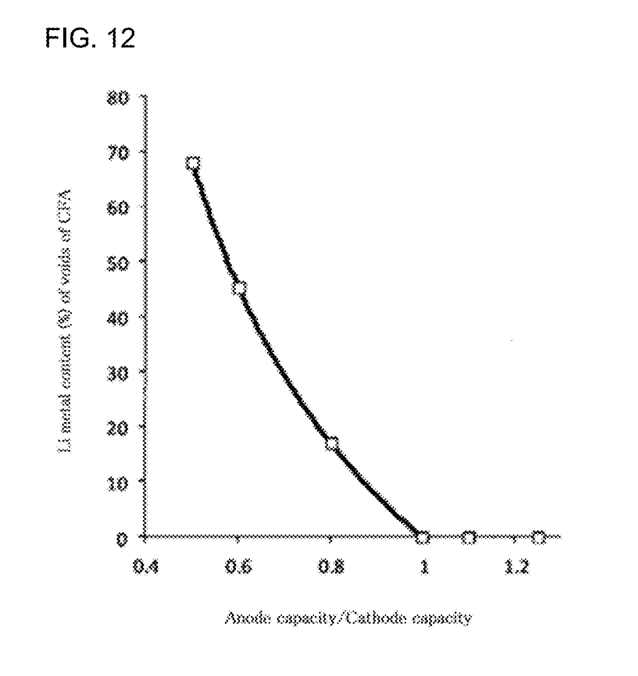
FIG. 12 is a view showing a relationship between, for the evaluation cell of Example 1, the anode capacity/cathode capacity value and the content (%) of a Li metal contained in the voids of the CFA.

FIG. 12 is a view showing a relationship between, for the evaluation cell of Example 1, the anode capacity/cathode capacity value and the percentage of a Li metal contained in the voids of the CFA.

The Li metal is deposited in the anode by decreasing the anode capacity/cathode capacity value lower than 1. However, the lithium ion secondary battery comprising the anode that comprises the carbon fiber assembly of the disclosed embodiments, has high charge-discharge efficiency and can use the capacity of the Li metal.

Accordingly, the volumetric energy density of the lithium ion secondary battery is effectively increased by decreasing the anode capacity/cathode capacity value.

The anode capacity/cathode capacity values of many conventional, laminate-type batteries are set to about 1.25, in order to prevent Li metal deposition in the anode.

Meanwhile, when the ratio of the capacity of the lithium metal to the capacity of the carbon fiber assembly of the lithium ion secondary battery of the disclosed embodiments (Li metal capacity/carbon (C) capacity) is set to 1 (that is, when the anode capacity/cathode capacity value is set to 0.5), the volumetric energy density of the cell is increased by 57.6% than ever before.

TABLE 2

| Anode capacity/ cathode capacity | Li capacity/ C capacity | Li metal content (%) of voids of CFA | Relative volumetric energy density value of cell |
|---|---|---|---|
| 1.25 | 0 | 0 | 100.0 |
| 1.10 | 0 | 0 | 107.9 |
| 1.00 | 0 | 0 | 113.9 |
| 0.80 | 0.25 | 17.0 | 128.1 |
| 0.60 | 0.67 | 45.5 | 146.5 |
| 0.50 | 1 | 67.9 | 157.6 |

REFERENCE SIGNS LIST

11. Anode current collector
12. Anode
13. Separation film
14. Cathode
15. Cathode current collector
16. Carbon fiber assembly
17. Lithium metal
100. Lithium ion secondary battery

The invention claimed is:
1. A lithium ion secondary battery comprising:
a columnar anode comprising a carbon fiber assembly having an assembled carbon fiber structure,
a cathode, and
an ion-conducting, insulating separation film disposed between the cathode and the anode to insulate the cathode and the anode from each other,
wherein a void content of the carbon fiber assembly is 20% or more and 40% or less, and wherein at least one of a lithium metal and a lithium alloy is contained in voids of the carbon fiber assembly, when the lithium ion secondary battery is in a fully charged state.

2. The lithium ion secondary battery according to claim 1, wherein a ratio of a capacity of the anode to a capacity of the cathode (anode capacity/cathode capacity) is smaller than 1.

3. The lithium ion secondary battery according to claim 1, wherein a metal to be alloyed with the lithium contained in the lithium alloy, is at least one kind of metal selected from the group consisting of gold, platinum, magnesium, zinc, tungsten, molybdenum, aluminum, gallium, indium, silicon, germanium, tin, lead, arsenic, antimony and bismuth.

4. The lithium ion secondary battery according to claim 1, wherein the anode is a polygonal columnar anode that a length of a side of a cross section in a direction perpendicular to a longitudinal direction, is 30 μm or more and 1000 μm or less, or a round columnar anode with a diameter of 30 μm or more and 1000 μm or less, and wherein an outer circumferential surface other than end surfaces in the longitudinal direction faces the cathode through the separation film.

5. A method for producing the lithium ion secondary battery defined by claim 1, the method comprising:
  loading the metal to be alloyed with the lithium or a compound of the metal on the surface of the carbon fibers by passing the carbon fibers through a first nozzle that is filled with a liquid containing the metal or the compound of the metal, and
  obtaining the carbon fiber assembly by assembling the metal-loading carbon fibers and passing the assembled carbon fibers through a second nozzle that is filled with a binder solution containing a binder.

* * * * *